United States Patent [19]

Henderson

[11] 3,727,924
[45] Apr. 17, 1973

[54] EXTERNALLY PRESSURIZED SEAL
[75] Inventor: Douglas J. Henderson, Mississauga, Ontario, Canada
[73] Assignee: Champlain Power Products Limited, Rexdale, Ontario, Canada
[22] Filed: July 8, 1970
[21] Appl. No.: 53,225

[52] U.S. Cl. ..................... 277/23, 277/74, 415/121
[51] Int. Cl. ..................... F16j 15/00, B65q 53/00
[58] Field of Search ................ 277/23, 74, 15, 17, 277/21; 415/121; 210/416, 435

[56] References Cited
UNITED STATES PATENTS

| 3,347,553 | 10/1967 | Schweiger | 277/74 X |
| 3,357,606 | 12/1967 | Kahlenberg | 138/30 X |
| 3,257,957 | 6/1966 | Tracy | 277/15 X |
| 3,291,489 | 12/1966 | Tracy et al | 277/23 X |
| 2,907,594 | 10/1959 | Macks | 277/23 |

Primary Examiner—Samuel B. Rothberg
Attorney—Maybee & Legris

[57] ABSTRACT

An externally pressurized hydrostatic seal comprises a rotor and a stator disposed in face to face sealing relation, the stator providing internal passageways for the passage of liquid to the sealing faces. A manifold member is clamped to the stator, the manifold member providing a chamber to which liquid is supplied under pressure, and a series of fine orifices through which the liquid flows from the chamber into the passageways, the manifold member being readily replaceable so that if the seal becomes inoperative by blockage of the orifices, the fault may be easily remedied.

6 Claims, 4 Drawing Figures

PATENTED APR 17 1973

Inventor
Douglas J. Henderson
By Maybee & Legris
Attorneys

Inventor
Douglas J. Henderson

By
Maybee & Legris
Attorneys

EXTERNALLY PRESSURIZED SEAL

BACKGROUND OF THE INVENTION

This invention relates to mechanical seals and in particular to externally pressurized hydrostatic seals of the kind which may be used, for example, on pumps for slurries and corrosive liquids to prevent leakage past the rotary shaft of the pump.

Such a seal normally comprises a first annular member, called the rotor, which is adapted to be mounted on the pump shaft, and a second member, called the stator, adapted to be mounted on a stationary part, the members being disposed in face to face relation and the rotor being urged axially towards the stator. Rubbing contact between the sealing faces is prevented by a film of liquid which acts as a sealing member between the sealing faces. For this purpose the stator is provided with internal passageways terminating at the stator sealing face, usually at grooves extending around the face, and a low viscosity liquid, such as water, from an external supply is fed under pressure through the passageways to the sealing face, so as to flow across the face and this provides the film. Thus there is a small clearance at all times between the sealing faces.

In order to produce the required liquid flow to form the film it is necessary to restrict the rate of liquid flow through the passageways. For this purpose it has invariably been the practice to provide very fine orifices at the delivery ends of the passageways, that is to say at the ends opening into the stator sealing face. Now the orifices need to be but a few thousandths of an inch in diameter, and consequently they easily become blocked by any solid particles in suspension. When this happens, the flow of liquid to the sealing faces is interrupted and it becomes necessary to shut down the pump or other apparatus in which the seal is used, the length of shut down depending upon the time it takes to remove the seal entirely from the pump and instal a replacement. The inconvenience and expense of having to replace seals in plant in operation constitutes a serious disadvantage of known mechanical seals of the type discussed above.

This disadvantage is largely overcome in a seal according to the present invention, which readily permits the replacement of defective parts necessitated by any blockage of the fine orifices.

SUMMARY OF THE INVENTION

An externally pressurized hydrostatic seal according to the present invention comprises a stator and a rotor disposed in face to face sealing relation, the stator providing a sealing face and internal passageways for conducting liquid to the sealing face. The seal is characterized by the combination of a manifold member providing an internal manifold chamber and orifice channels leading therefrom, clamping means for clamping the manifold member into sealing engagement with the stator with the orifice channels communicating with the passageways and means for connecting the manifold chamber to a pressurized liquid supply. The pressurized liquid, which may be water, flows from the manifold chamber into the passageways, the rate of flow being restricted by the orifice channels of the manifold member, but the passageways being dimensioned to permit unrestricted flow of liquid to the sealing face. Therefore, if the orifice channels, which are of very small area, become blocked, it is only necessary to dismantle and replace the manifold member rather than the complete seal.

The passageways in the stator may lead into one or more arcuate grooves or channels formed in the sealing face of the stator, or other depressions of relatively large area.

In a preferred embodiment of the invention, the manifold chamber is of cylindrical shape having a liquid inlet at one end, the orifice channels being spaced along the length of the chamber, and a tubular screen is disposed within the chamber between the liquid inlet and the orifice channels so that liquid must flow through the screen before passing to the orifice channels.

BRIEF DESCRIPTION OF THE DRAWINGS

One embodiment of the invention will now be described by way of example with reference to the accompanying drawings, in which.

DESCRIPTION OF THE PREFERRED EMBODIMENT

Figure 1:
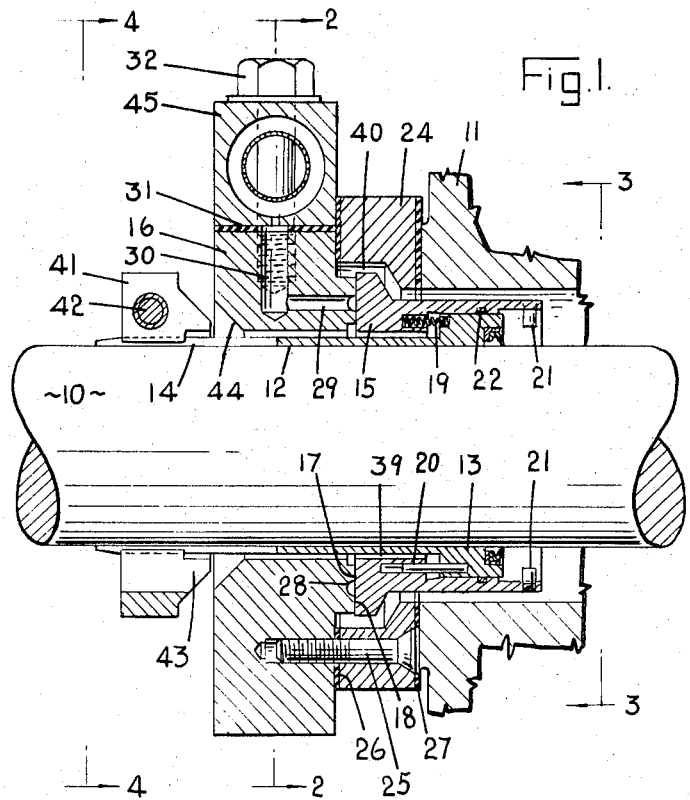
FIG. 1 is a sectional elevation of a mechanical seal according to the invention installed on a rotary pump, the figure showing a section on line 1—1 in FIG. 3.

FIG. 1 shows a fragment of a pump for slurries, the pump having a rotary shaft 10 extending from a pump casing 11. A sleeve 12 is rigidly mounted on the shaft 10, the sleeve having a cylindrical portion 13 and a number of axially extending splines 14.

The seal comprises an annular rotor 15 and an annular stator 16, the rotor and stator being coaxial with the shaft 10 and with one another and being disposed face to face. The rotor 15 has an annular sealing face 17 disposed adjacent to a cooperating annular sealing face 18 of the stator, there being normally a clearance of a few thousandths of an inch between the sealing faces during operation of the seal. A number of short compression springs 19 connected to the annular rotor 15 and bearing against an annular stepped portion 19 of the sleeve 12, urge the rotor axially towards the stator 16, axially extending roll pins 20 cooperating with holes in the rotor to preserve the necessary axial alignment, and a pair of radially extending roll pins 21 being secured to the inner end of the rotor for limiting its axial movement. An O-ring 22 located in an annular recess in the rotor provides a sliding seal between the rotor and the surface of the sleeve 12.

The stator 16 is clamped to the pump casing 11 by a pair of diametrically opposed clamping bolts 23, an annular spacer member 24 being bolted by bolts 25 to one face of the stator 16 for spacing it from the pump casing. A pair of sealing gaskets 26 and 27 are disposed between the mating faces of the stator and the spacing member, and of the spacing member and the pump casing, respectively. It will be observed from the drawings that there is an annular clearance between the stator and the shaft sleeve 12.

The sealing face 18 of the stator is formed with an annular groove 28 (which might equally well be a series of arcuate grooves extending around the sealing face), and a plurality of internal passageways 29 extending from inlet openings 30 at a flat external face 31 of the stator 16 terminate in the groove 28 (or the equivalent arcuate grooves) thus opening onto the sealing face 18. Mounted on the external face 31 of the stator and clamped to the stator by clamping bolts 32 is a manifold member 45, a sealing gasket 33 being disposed between the manifold member and the face 31.

Figure 2:
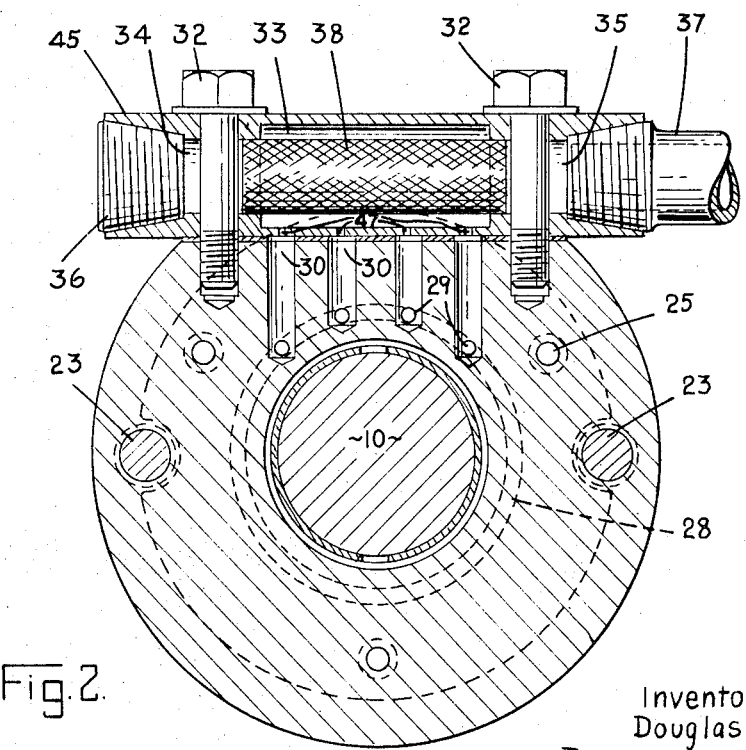
FIG. 2 is a section on line 2—2 in FIG. 1.
Figure 3:
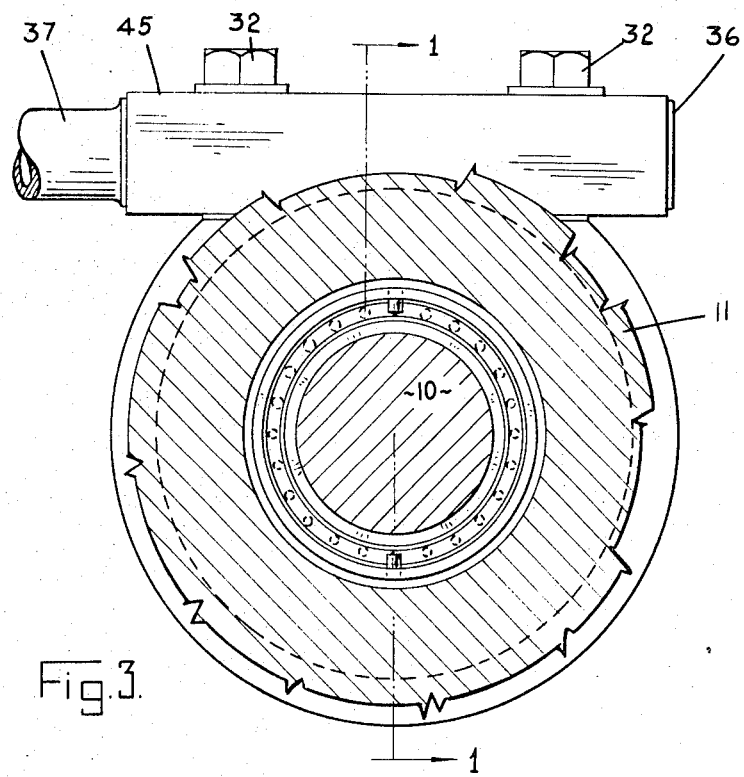
FIG. 3 is a section on line 3—3 in FIG. 1.
Figure 4:
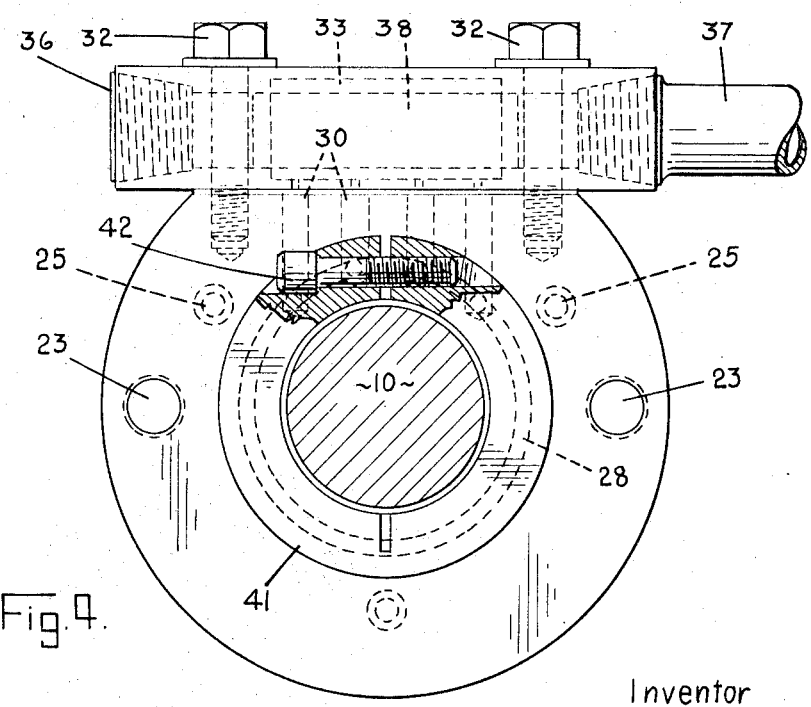
FIG. 4 is an end elevational view on line 4—4 in FIG. 1.

The manifold member 45 consists of an elongated, transversely extending block of square cross section, the block being bored to provide a cylindrical internal chamber 33 with an inlet opening 34, 35 at each end. The inlet openings 34 and 35 are adapted to provide alternative means for connecting the manifold member to a pressurized supply of water or other liquid of low viscosity. As shown in FIG. 2, the inlet 34 is closed by a plug 36, and a liquid supply pipe 37 is connected to the inlet 35.

Spaced along the length of the manifold chamber 33 are four orifice channels 47 leading from the chamber and communicating with the inlet openings 30 of the passageways 29. The orifice channels 47 are of much smaller area than the inlet openings 30, and provide restrictions to the flow of liquid. Within the chamber 33 is a tubular filter screen 38 through which the liquid must pass before reaching the orifice channels, the filter serving to reduce the risk that the orifice channels might be blocked by solid particles in the liquid.

In operation of the seal, liquid at the required pressure passes into the chamber 33, through the filter screen 38 and into the passageways 29 via the orifices 47 and inlet openings 30. The supply of liquid via the passageways 29 maintains a flow of liquid between the sealing faces 17 and 18 of the rotor and stator, to maintain a small clearance between the faces. The flow of liquid across the sealing faces is in two directions, out along the rotary shaft 10 through the annular space 39 (FIG. 1) and into the pump liquid through the annular space 40 (FIG. 1).

If the flow of liquid to the sealing faces should become impeded by blockage of the orifice channels, it is necessary to shut down the pump while the fault is remedied, of course. The time of shut down is very much less than with existing seals, however, because in this case it is only necessary to replace the manifold member and not the complete seal assembly.

An advantageous feature of the illustrated embodiment is a special means for axially aligning the components of the seal during installation. A split collar 41 is mounted on the shaft 10 and prevented from rotating relatively to the shaft by the splines 14. A clamping bolt 42 is provided for tightening the collar. The collar 41 has an axially extending annular lip 43 of wedge-shaped cross section, which is adapted to mate with a conical surface 44 on the stator. When installing the seal the collar is set by tightening the clamping bolt 42 with the lip 43 engaging the conical surface 44. Axial alignment of the parts is thus maintained while the stator 16, spacer member 24, pump casing 11 and manifold member 45 are bolted together as a rigid assembly, after which the collar 41 is loosed and backed away from the stator.

What I claim as my invention is:

1. An externally pressurized hydrostatic seal comprising:
    a rotor having an annular sealing face,
    a stator having a sealing face disposed adjacent to the rotor sealing face,
    the stator providing internal passageways terminating at said sealing face of the stator and extending from inlet openings at an external face of the stator,
    a manifold member removably secured to said external face,
    the manifold member providing an internal manifold chamber and a plurality of orifice channels extending therefrom,
    the orifice channels communicating with said inlet openings and being of smaller area than the inlet openings,
    and means for supplying pressurized liquid to the manifold chamber whereby to establish a flow of liquid through said orifice channels, said passageways, and between said sealing faces.

2. An externally pressurized hydrostatic seal according to claim 1, said sealing face of the stator providing one or more arcuate grooves and said passageways terminating at said groove or grooves.

3. An externally pressurized hydrostatic seal according to claim 2, including spring means connected to the rotor for urging the rotor axially towards the sealing face of the stator.

4. An externally pressurized hydrostatic seal comprising:
    a rotor having an annular sealing face,
    a stator having an annular sealing face disposed adjacent to the rotor sealing face, and a flat external surface,
    spring means connected to the rotor for urging the rotor axially towards the sealing face of the stator,
    the stator sealing face providing one or more arcuate grooves extending around the stator sealing face,
    the stator providing internal passageways terminating at said groove or grooves and extending from inlet openings at said external surface,
    a manifold member,
    the manifold member providing an internal manifold chamber and a plurality of orifice channels leading therefrom,
    clamping means for clamping the manifold member into sealing engagement with the flat external surface of the stator, the orifice channels communicating with said inlet openings,
    said orifice channels being of smaller area than the passageways for providing a restriction to liquid flow,
    and means for connecting said manifold chamber to a pressurized liquid supply.

5. An externally pressurized hydrostatic seal according to claim 4, wherein the manifold chamber is of cylindrical shape having a liquid inlet at one end, said orifice channels being spaced along the length of the chamber, and wherein a tubular screen extending for the length of the chamber is disposed within the chamber between the liquid inlet and the orifice channels.

6. In a pumping apparatus comprising a stationary casing and a rotary shaft extending through an opening in the casing, an externally pressurized hydrostatic shaft seal comprising:
- a rotor member mounted on said shaft for rotation therewith, the rotor member having an annular sealing face,
- a stator member rigidly mounted on the casing and having a grooved sealing face cooperating with the rotor sealing face,
- the stator member further having a flat external face and providing internal passageways extending between the flat external face and the grooves of said stator sealing face,
- a manifold member consisting of an elongated block providing a flat external surface, the block further providing a longitudinally extending internal, cylindrical chamber with an inlet opening and a plurality of orifice channels extending between the chamber and said flat external surface,
- a tubular screen mounted within the chamber to provide filter means between the inlet opening and the orifice channels,
- means for clamping the manifold member to the stator member, the flat external surface of the manifold member sealingly engaging the flat external face of the stator member with said orifice channels registering with said passageways,
- the orifice channels being of smaller area than said passageways for restricting liquid flow,
- and means for connecting a pressurized liquid supply to said inlet opening for supplying pressurized liquid to the manifold chamber.

* * * * *